May 26, 1942. F. M. REID Re. 22,102
HEAVY DUTY VEHICLE
Original Filed June 23, 1926 3 Sheets-Sheet 1
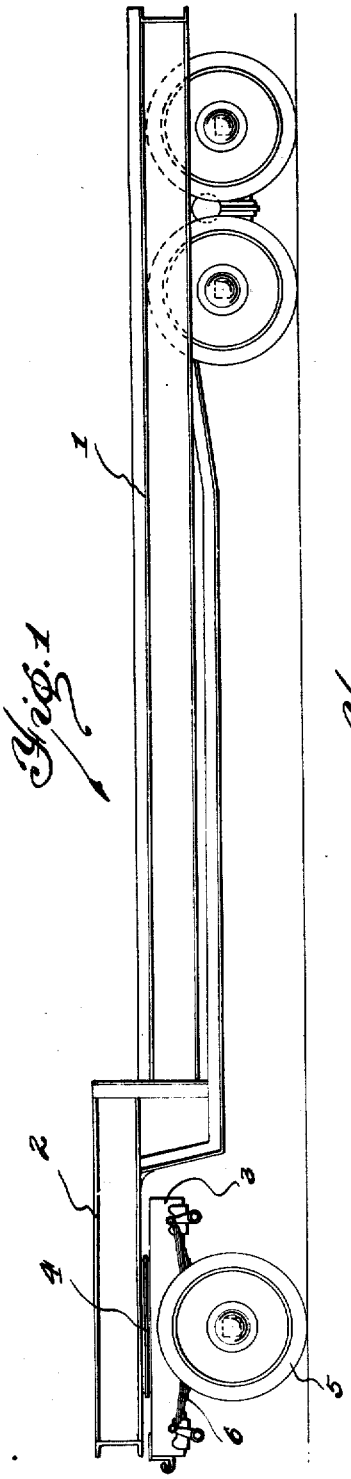
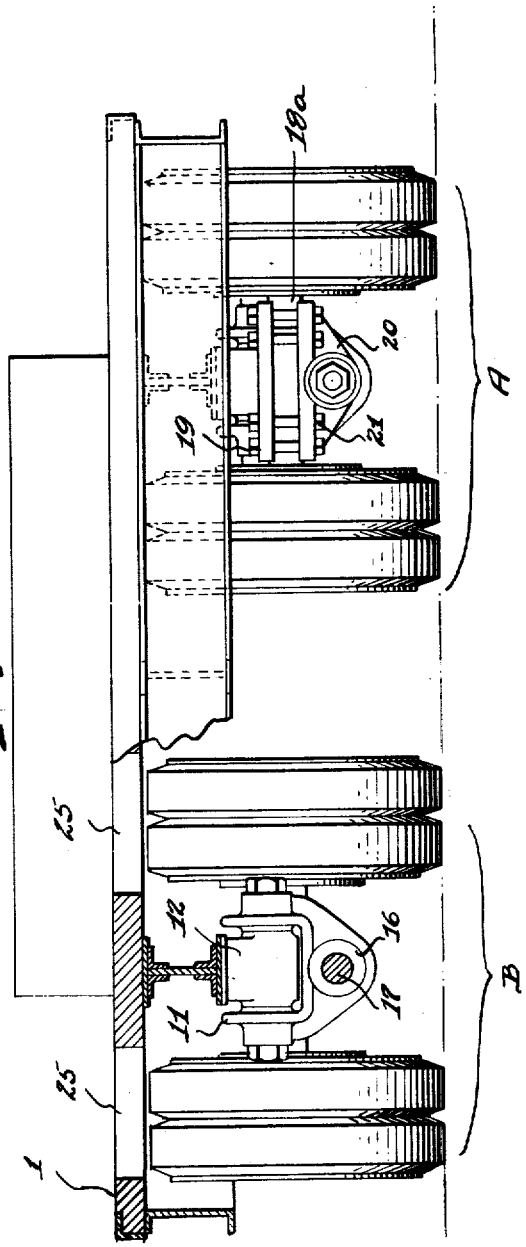
INVENTOR.
Frederick Malcolm Reid
BY
Stuart C. Barnes
ATTORNEY.

HEAVY DUTY VEHICLE

Original Filed June 23, 1926 3 Sheets-Sheet 2

INVENTOR.
Frederick Malcolm Reid
BY
Stuart C. Barnes
ATTORNEY.

May 26, 1942. F. M. REID Re. 22,102

HEAVY DUTY VEHICLE

Original Filed June 23, 1926 3 Sheets-Sheet 3

INVENTOR.
Frederick Malcolm Reid

BY Stuart C. Barnes
ATTORNEY.

Reissued May 26, 1942 Re. 22,102

UNITED STATES PATENT OFFICE 22,102

HEAVY DUTY VEHICLE

Frederick Malcolm Reid, Detroit, Mich., assignor to Fruehauf Trailer Company, Detroit, Mich., a corporation of Michigan Original No. 1,690,247, dated November 6, 1928, Serial No. 117,944, June 23, 1926. Application for reissue August 29, 1941, Serial No. 408,907

8 Claims. (Cl. 280—81)

This invention relates to vehicles and has to do more particularly with vehicles of the heavy duty type for carrying heavy loads.

It is recognized that roads are damaged where insufficient road contact is provided by the wheels of a vehicle. In many places, especially in cities, certain specifications must be complied with in transporting heavy loads, in order that the load be distributed over a sufficient area on the road to prevent damage to the same. Ordinary vehicles, or trucks, have no particular difficulty meeting such specifications, but where excessive loads are to be transported the provision of sufficient area to distribute the weight so that the roadway will not be damaged, presents a difficult problem.

According to the present invention a vehicle is contemplated which is of such a construction that loads in the neighborhood of eighty tons, or more, may be transported. As an example of such a load, the large excavating machines of the type for digging large trenches may be cited. Many of these machines are such that they can move under their own power, but this is exceedingly slow, and in addition to this, the machines are often put out of operating condition by the vibration due to such movement. Heretofore, such machines have been dismantled in order that they may be transported. Dismantling of the machines and moving them under their own power is slow and expensive procedure, and the dismantling is a particularly expensive one. This invention contemplates a vehicle by which these large machines, and other heavy articles, can be quickly carried from one job to another.

A vehicle of this type may take the form of a trailer which is adapted to be drawn by a suitable truck or tractor. According to the invention the vehicle is provided with a multiplicity of wheels to give the same sufficient road contacting area, and these wheels are so mounted as to have movement relative to each other and to the vehicle body for the purpose of accommodating unevenness in the roadway.

An advantageous form of the invention is somewhat diagrammatically shown in the drawings wherein:

Fig. 1 is a side view of the vehicle;

Fig. 2 is a rear view with parts cut away;

Figure 3:
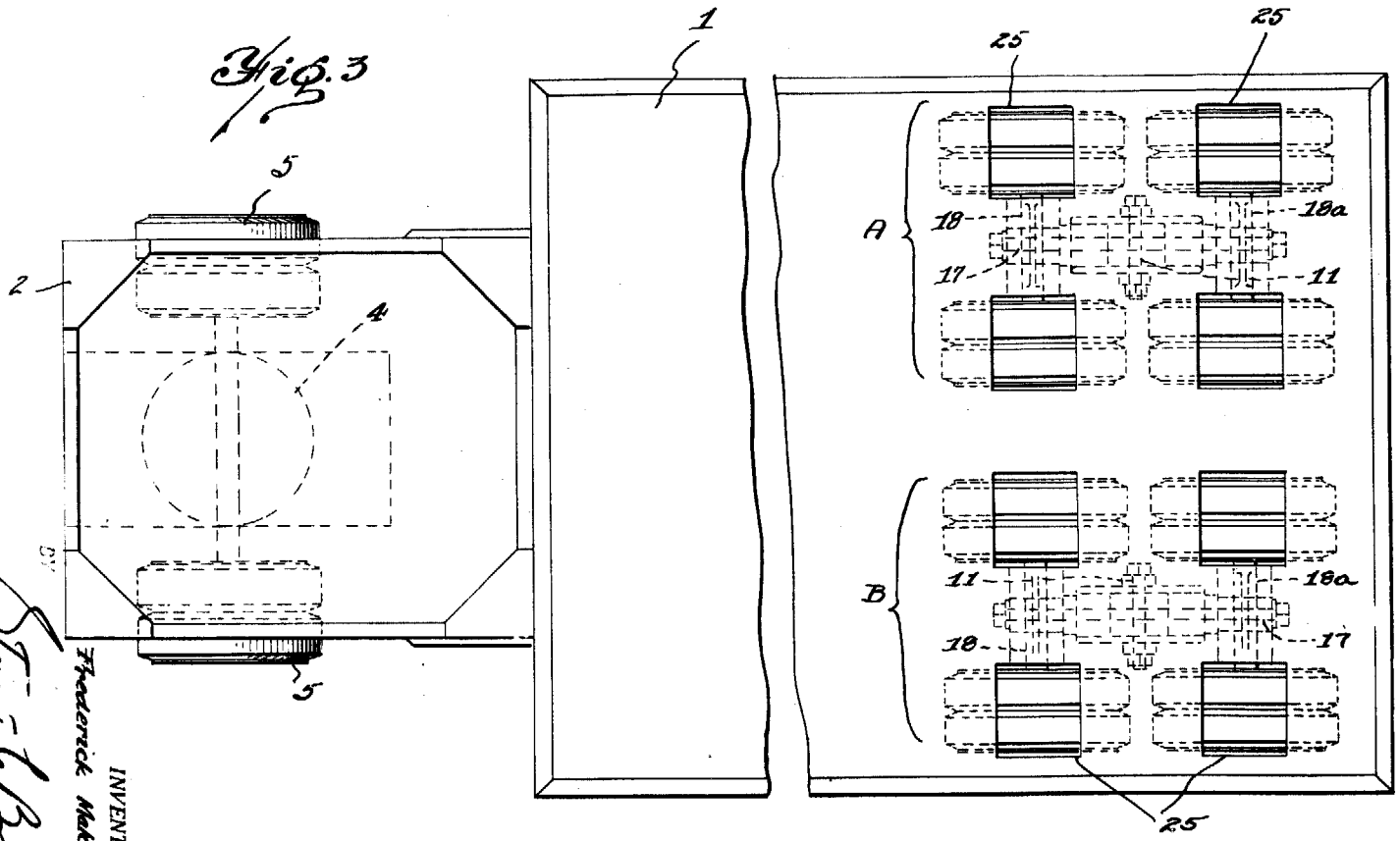
Fig. 3 is a diagrammatic plan view.

Referring to the drawings the vehicle is shown as consisting of a frame or platform 1 which is preferably constructed so as to be relatively close to the ground, and the forward end of the frame may be somewhat elevated as at 2. The forward end of the vehicle may be provided with a subframe 3 which supports the main frame 2 through a fifth wheel construction 4. This subframe is mounted on the front wheels 5 by means of springs 6, although the springs may be eliminated if desired. The vehicle is adapted to be drawn by a tractor which is secured to the front end thereof.

The frame, or platform 1, carries the major part of the load, and the rear portion of the frame rests upon a plurality of wheels, eight of such wheels being shown in the present instance.

Figure 4:
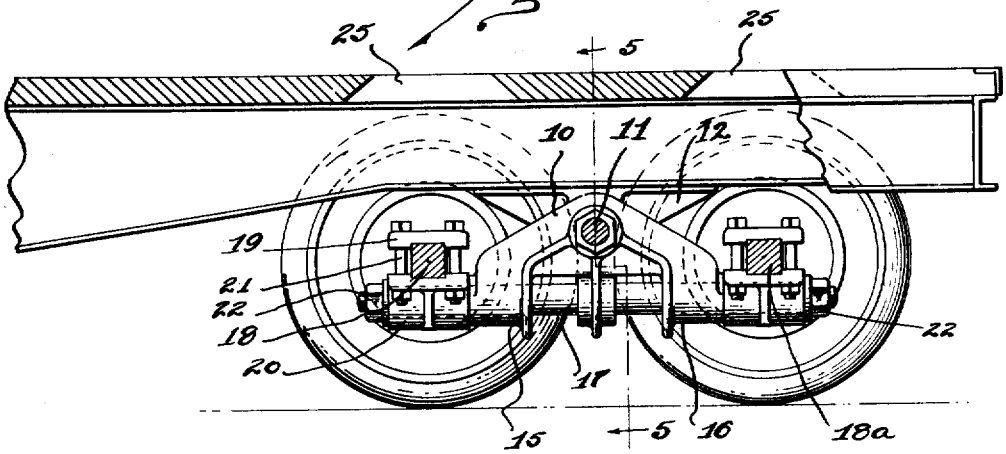
Fig. 4 is a side view showing the wheel mounting.

As indicated in Figs. 2 and 3 the eight wheels are formed into two groups, thus forming two trucks, A and B, composed of four wheels each. These trucks are identical in structure, and a description of one will suffice for both. Each truck includes a yoke member 10, Fig. 4, which may be a casting, and a supporting pin 11 passes through the yoke members of this casting. The vehicle frame is supported, as shown at 12, by a member through which the supporting pin passes, and which lies between the yoke members of the casting 10. The supporting pin 11 may take the form of an ordinary large threaded bolt provided with a nut threaded upon the end thereof opposite the head, as shown. It may be noted that the pin 11 forms the sole connection between each truck and the vehicle frame. Consequently the pin 11 of each truck forms the sole draft means between such truck and the frame and, in conjunction with the cooperating opposed and contacting faces of the yoke member 10 and supporting member 12, forms the sole means for maintaining the corresponding truck in longitudinal alignment with the vehicle.

The yoke member (Figs. 4 and 5) is provided with spaced bearings 15 and 16 through which extends a bolt-like member 17. This bolt-like member supports the axles 18 and 18a of the forward and rear wheels of the truck. These axles may be of square formation, and may be secured to the bolt-like member by means of a clamp 19, and bracket 20 which are disposed on opposite sides of the axle and secured together by bolts 21. The bracket 20 is rotatably mounted upon the bolt-like member 17, and nuts 22 may be secured to the ends of the bolt, thus holding the brackets 20 in place.

By this construction it will be seen that each truck, A and B, can rock upon the supporting bolt 11 in a vertical plane, and at the same time, the forward pair of wheels, and the rear pair of wheels of each truck can rock upon the shaft 17 in vertical planes which are at right angles to the rocking of the truck as a whole. This construction permits the two trucks to move relative to each other and also permits the forward and rear wheels of each truck to move relative to each other. In this manner irregularities in the road surface are accommodated for, and the load carried by the vehicle is substantially evenly divided among all the wheels. It will be understood that if the wheels were rigidly mounted an irregularity in the roadway would lift one or more wheels from the ground so that they would be suspended in the air thus throwing all the weight on the other wheels, but by this relative movable arrangement each wheel supports its share of weight regardless of such irregularities.

Figure 5:
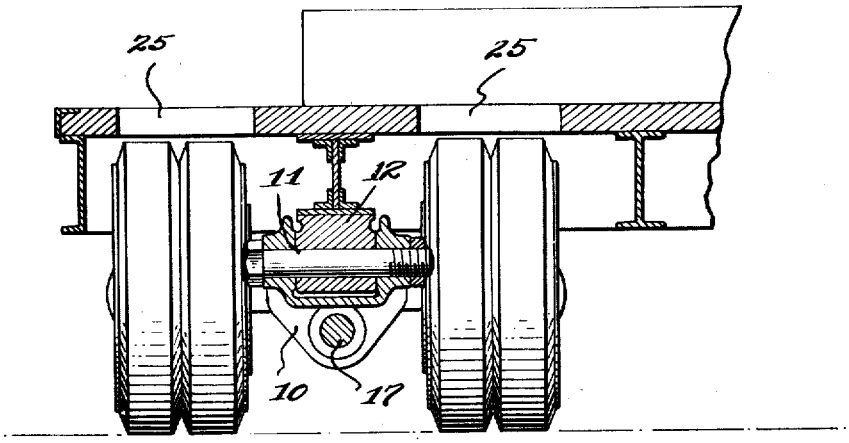
Fig. 5 is a sectional view taken on line 5—5 of Fig. 4.

As indicated in Fig. 5, the platform of the vehicle is positioned relatively low and thus is close to the upper surface of the wheels. It is desirable to have the vehicle of this low construction in order to easily place and remove the loads therefrom, and in order to permit sufficient movement of the truck wheels, the platform may be cut away over each wheel, as at 25. This, of course, would be unnecessary if the platform were sufficiently high to permit such movement of the wheels.

The vehicle shown herein is in the form of a trailer adapted to be transported by being drawn by a tractor, or other powered vehicle. The truck construction, however, which permits relative movement between the wheels may be used in a vehicle which moves under its own power as well as in a trailer. In this case the power might well be transmitted to the front wheels of the vehicles, or may be transmitted to some or all of the rear wheels, as for instance, by means of a chain drive. Also the vehicle can be provided with braking mechanism, and air brakes would be advantageous in a vehicle of this heavy duty type. The drawings show a vehicle which is supported by two trucks each of which are constructed as above described. Such a vehicle is suitable for transporting a load which is in the neighborhood of eighty tons, but the vehicle need not be limited to two trucks as more can be used where the weight of the load requires.

What I claim is:

1. In a heavy duty vehicle, a frame, two four-wheel trucks forming the sole support for one end of the frame and the wheels of which are adapted for direct contact with the ground, one truck being secured adjacent each side of the frame and both of the said trucks being rigidly secured to the frame by transversely extending pivot pins so that they can pivot in a vertical plane, the four ground engaging wheels of each truck being mounted in forward and rearward pairs, each pair of ground engaging wheels being connected to its respective truck by a longitudinally extending pivot pin which permits them to pivot in a vertical plane which is at right angles to the pivotal movement of the truck.

2. In a heavy duty vehicle, a frame, two four-wheel trucks for supporting one end of the frame and the wheels of which are adapted for direct contact with the ground, one truck being secured adjacent each side of the frame and both of the said trucks being rigidly secured to the frame by transversely extending pivot pins so that they can pivot in a vertical plane, the four ground engaging wheels of each truck being mounted in forward and rearward pairs, each pair of ground engaging wheels being connected to its respective truck by a longitudinally extending pivot pin which permits them to pivot in a vertical plane which is at right angles to the pivotal movement of the truck, the first mentioned pivot pins and their supporting parts forming the sole draft and direction maintaining connections between said trucks and said frame.

3. In a heavy duty vehicle, a frame, two four-wheel trucks forming the sole support for one end of the frame and the wheels of which are adapted for direct contact with the ground, one truck being secured adjacent each side of the frame and both of the said trucks being rigidly secured to the frame by transversely extending pivot pins so that they can pivot in a vertical plane, the four ground engaging wheels of each truck being mounted in forward and rearward pairs, each pair of ground engaging wheels being connected to its respective truck by a longitudinally extending pivot pin which permits them to pivot in a vertical plane which is at right angles to the pivotal movement of the truck, the first mentioned pivot pins and their supporting parts forming the sole draft and direction maintaining connections between said trucks and said frame.

4. In a heavy duty vehicle, a main load carrying frame in relatively close proximity to the ground, a vertically upwardly offset portion at the front end of said frame adapted to vertically clear the wheels of a cooperating supporting means, means associated with said offset portion adapting it for pivotal connection with said supporting means, two four-wheel trucks forming the sole supporting means for the rear end of said frame and the wheels of which are adapted for direct contact with the ground, one truck being secured adjacent each side of the frame and both of the said trucks being rigidly secured to the frame by transversely extending pivot pins so that they can pivot in a vertical plane, the four ground engaging wheels of each truck being mounted in forward and rearward pairs, each pair of ground engaging wheels being connected to its respective truck by a longitudinally extending pivot pin which permits them to pivot in a vertical plane which is at right angles to the pivotal movement of the truck, the first mentioned pivot pins and their supporting parts forming the sole draft and direction maintaining connections between said trucks and said frame.

5. In a heavy duty vehicle, a frame, two four-wheel trucks forming a sole support for one end of the frame and the wheels of which are adapted for direct contact with the ground, one truck being secured adjacent each side of the frame and both of said trucks being secured to the frame for pivotal movement in vertical planes extending longitudinally of the vehicle about an axis fixed with respect to said frame and extending transversely of the length of the vehicle, the four ground engaging wheels of each truck being mounted in forward and rearward pairs, each said pair of ground engaging wheels being connected to its respective truck about an axis fixed with respect to said truck for pivotal movement in a vertical plane extending at right angles to the first mentioned plane.

6. In a heavy duty vehicle, a frame, two four-wheel trucks forming the sole support for one end of the frame and the wheels of which are adapted for direct contact with the ground, one truck being secured adjacent each side of the frame, each truck comprising a member extending longitudinally of the vehicle and connected between its ends to said frame for pivotal movement in a vertical plane extending longitudinally of said frame about an axis fixed with respect to said frame, and an axle mounted at a point between its ends upon each end of said longitudinally extending member for pivotal movement in a vertical plane extending at right angles to the first mentioned plane about an axis fixed with respect to said longitudinally extending member, each end of said axles having one of said wheels rotatably mounted thereon.

7. In a heavy duty vehicle, a frame, two four-wheel trucks forming the sole support for one end of the frame and the wheels of which are adapted for direct contact with the ground, one truck being secured adjacent each side of the frame and each of said trucks being secured to the frame for pivotal movement in a vertical plane about a transversely extending axis fixed with respect to said frame, the four ground engaging wheels of each truck being mounted in forward and rearward pairs, each of said pairs of ground engaging wheels being connected to its respective truck for pivotal movement in a vertical plane which is at right angles to the aforementioned pivotal plane of the truck about an axis fixed with respect to said truck, and each pair of wheels being rotatable about a line passing above the axis about which the last-mentioned pivotal movement occurs.

8. In a heavy duty vehicle, a frame, two four-wheel trucks forming a sole support for one end of the frame and the wheels of which are adapted for direct contact with the ground, one truck being secured adjacent each side of the frame, each of said trucks comprising a yoke member, a pin connecting the said yoke member to said frame and about which the yoke member is adapted to pivot in a vertical plane, a bolt carried by said yoke and extending at right angles to said pin, a forward pair of road engaging wheels carried by said bolt and a rearward pair of road engaging wheels carried by said bolt, each pair of wheels being mounted to pivot in a vertical plane about said bolt independently of each other and independently of the pivotal movement of the yoke, and each said pair of wheels being rotatable about a line spaced upwardly from the axis of the corresponding bolt.

FREDERICK MALCOLM REID.